United States Patent [19]

Bibby et al.

[11] Patent Number: 4,614,022

[45] Date of Patent: Sep. 30, 1986

[54] METHOD FOR FORMING MULTI-LAMINATE CORE ASSEMBLY

[75] Inventors: Kenneth Bibby, Norwood; Frank R. Ring, Jr., Walpole, both of Mass.

[73] Assignee: Applied Plastics Co., Inc., Norwood, Mass.

[21] Appl. No.: 739,558

[22] Filed: May 30, 1985

[51] Int. Cl.⁴ .................... H02K 15/00; H02K 15/02; B23P 17/00

[52] U.S. Cl. ...................................... 29/596; 29/605; 29/527.2; 242/1.1 R

[58] Field of Search ................ 29/596, 598, 605, 597, 29/733, 732, 729, 458, 527.2; 242/1.1 R, 1.1 E; 310/10, 259, 42, 43, 217; 156/314, 315

[56] References Cited

U.S. PATENT DOCUMENTS

| | | | |
|---|---|---|---|
| 2,917,643 | 12/1959 | Mihanowich | 29/596 |
| 3,222,626 | 12/1965 | Feinberg et al. | |
| 3,293,471 | 12/1966 | De Jean et al. | |
| 3,502,914 | 3/1970 | Cox | |
| 3,512,902 | 5/1970 | Emmons et al. | 29/596 |
| 3,821,846 | 7/1974 | Pleiss et al. | 29/596 |
| 4,051,286 | 9/1977 | Abbott | 156/314 |
| 4,085,347 | 4/1978 | Lichius | 310/254 |

*Primary Examiner*—Mark Rosenbaum
*Assistant Examiner*—Irene G. Golabi

[57] ABSTRACT

A method of forming a laminate core of a multiplicity of magnetic plates in a stack, including the steps of assembling the plates and applying a strip of adhesive to a surface of the stack. The adhesive is allowed to dry to hold the plates assembled during subsequent steps, e.g., coating with dry particles of thermoset resin which are subsequently cured to form an integral layer to secure the plates in a substantially rigid unit. In preferred embodiments, the adhesive decomposes at the temperature of curing of the thermoset resin layer.

4 Claims, 6 Drawing Figures

METHOD FOR FORMING MULTI-LAMINATE CORE ASSEMBLY

The invention relates to multiple plate laminates, e.g. of the type employed as the magnetic stator core in a small alternating current induction motor, and methods of making the same. The core is typically formed of a stack of thin metal laminations having slots and teeth at desired locations for accomodation of windings, and a circular center bore for receiving a rotor.

The laminations must be held on precise alignment with each other to provide a uniform gap between the core and the rotor, and must be interconnected to form a rigid assembly to avoid impairment to motor performance, increased wear or even damage.

It has been widely known to apply a coating of epoxy or varnish between adjacent layers of laminations to prevent movement therebetween by dipping an assembly into the liquid coating material to be drawn between the layers by capillary action. Such coatings, however, have been susceptible to thermoplastic flow, e.g. at curing temperature or at the temperature of operation. It has been thought to overcome this problem by use of laminations with roughened surfaces for metal-to-metal contact of adjacent laminations, or by limiting the amount of coating material drawn into areas most susceptible to thermoflow, e.g. areas of concentrated pressure, or by avoiding flow into these areas completely. An example of the latter is shown in Lichius U.S. Pat. No. 4,085,347, which also suggests strip welding an assembled stack of plates to facilitate handling during bonding and assembly.

Objectives of this invention include providing a method of forming a multi-laminate core that has reduced susceptibility, relative to prior art cores, to delamination and relative movement and providing a method of forming such a core that requires less manpower.

SUMMARY OF THE INVENTION

According to the invention, a method of forming a laminate core comprising a multiplicity of magnetic plates arrayed in face-to-face relation in a stack having opposite end surfaces, a generally circumferential outer side surface, and an axial bore sized and adapted for receiving a rotor, at least one of the outer side and bore defining surfaces also defining a multiplicity of notches sized and configured for receiving windings, comprises: assembling the plates in the stacked relationship; applying at least one strip of adhesive material generally axially along the outer surface of the assembled stack in an area not defining a notch, allowing the adhesive to dry in a manner to hold the plates assembled during handling at least prior to a curing step; applying, in powdered form, by spraying, a layer of dry particles of a thermoset synthetic resin to the surfaces of the assembly of plates defining the notches, the particles forming a layer covering the side surfaces of the discrete plates, and extending across spaces between adjacent plates in the stack, particles of the resin entering the spaces between the plates; and heating the stack to a temperature at least sufficient to cure the synthetic resin to form an integral layer upon the surfaces of the stack defining the notches and extending into the gaps between the plates of the stack; whereby the cured thermoset resin forms the plates into a substantially rigid unit not subject to movement between layers during handling or at elevated temperatures of use.

In preferred embodiments, the adhesive is selected to decompose at a temperature experienced during curing of the synthetic thermoset resin or the strip of adhesive is removed after cure of the resin; prior to heating the stack to cure the resin, the dry particles of resin are wiped from selected surfaces of the stack to limit formation of the integral layer to desired surfaces of the laminated core; the plates are punched, and are assembled with punching burrs oriented for more intimate plate-to-plate contact; Coated or uncoated stamping stock may be used.

Other features and advantages of the invention will be understood from the following description of the presently preferred embodiments, and from the claims.

PREFERRED EMBODIMENT

We briefly describe the drawings.

DRAWINGS

Figure 1:
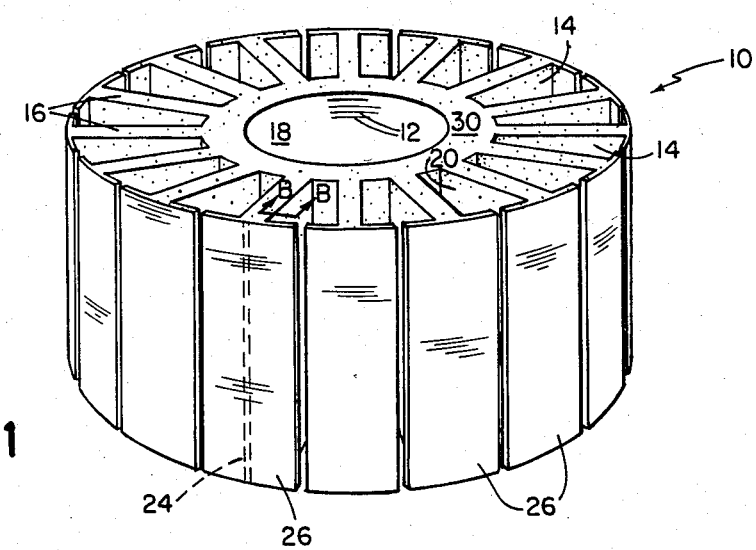
FIG. 1 is a perspective view of a stator core according to the invention.

Referring to FIG. 1, a laminated stator core 10 constructed according to the method of the invention consists of a stack of thin laminations 12, typically stamped from sheet material capable of being magnetized, e.g., such as steel, of a desired thickness.

All the laminations 12 in the stack are identical, with corresponding notches 14 in the outer periphery, separated by radially extending arms 16, and an axial opening 18 at the center for receiving a rotor, not shown.

The stator case and rotor are mounted independently, so, as mentioned above, the laminations in the stack must be held in precise alignment with each other to provide a uniform gap between the core and the rotor. To achieve this result in the stator core of the invention, selected surfaces of the assembled laminations, i.e. surfaces 20 defining the notches, are coated with a powdered thermoset plastic 22 which is heat cured to bond the laminations into a rigid unit.

According to the invention, the stator core 10 is constructed by assembling a multiplicity of lamination plates 12 in face-to-face relation in a stack, with the arms 16 in close alignment defining notches 14 and a central, rotor-receiving bore 18. The laminations are typically punched, and the method of the invention permits stacking with all punching burrs in the same direction thereby providing intimate contact between laminations.

Figure 2:
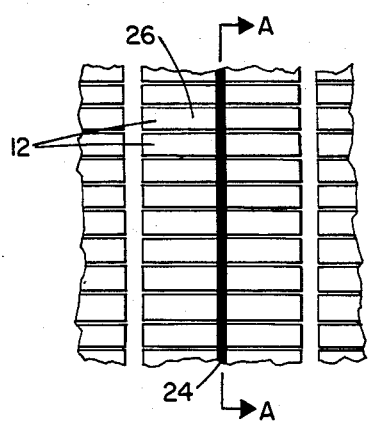
FIG. 2 is a somewhat diagrammatic plan view of a segment of the outer surface of the stator core of FIG. 1.
Figure 3:
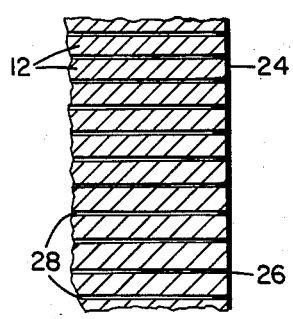
FIG. 3 is a side sectional view of the core at line A—A of FIG. 2

Referring to FIG. 2, the stack of laminations is clamped, and one or more strips 24 of adhesive, e.g. a cyanoacylate adhesive sold by Minnesota Mining and Manufacturing Company of St. Paul, Minnesota, selected to have a temperature of decomposition between the set-up and curing temperatures of the resin, as described below, are applied to the outer surfaces 26 of the assembly, parallel to the core axis. Referring also to FIG. 3, the adhesive flows by capillary action into the spaces 28 between adjacent laminations in the stack and dries in a manner to temporarily bond the assembly during the further steps of manufacturing.

Figure 5:
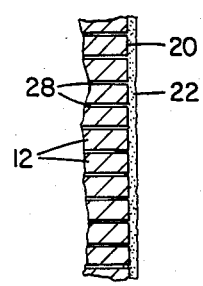
FIGS. 5 and 6 are sequential side sectional views of the stator core at the line B—B of FIG. 1 showing the assembled stack after coating and before curing, and after curing, respectively.
Figure 6:
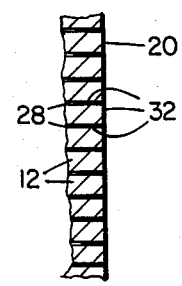

The clamping means are removed, and, referring to FIG. 5, powdered thermoset resin 22 is spray coated onto selected surfaces of the assembled core, typically on the surfaces 20 defining the notches and also the end surfaces 30. (The use of dry resin powder permits other surfaces to be wiped clean of the powdered resin prior to curing.) As shown in FIG. 5, the spray coating process causes some penetration of the powdered resin into spaces 28 between adjacent laminations. The powder coated assembly is then heat-treated to a predetermined temperature, e.g. about 400° F., selected to cause the powdered resin to flow upon the coated surfaces of the assembly and cure into an integral coating 32 upon the surfaces of the stator core. As shown in FIG. 6, during flow and cure, the resin penetrates further into spaces 28 between the adjacent laminations and cures in place. The resulting assembly of laminations is thus bonded into an integral, rigid unit, with the separate laminations securely held against movement under conditions of use or shipment.

Figure 4:
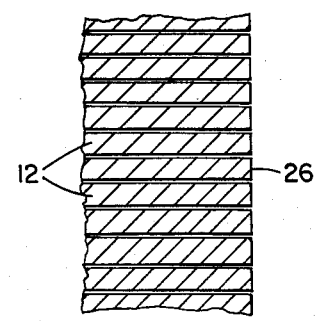
FIG. 4 is a similar view at line A—A after curing.

As mentioned above, the adhesive used to bond the laminations together during processing is preferably selected to decompose at a temperature above the set-up temperature of the powdered thermoset resin, e.g. about 200° F., at which point the laminations are held assembled by the resin, and below the cure temperature of the powdered thermoset resin (400° F.), e.g. at about 275° F., so the outer uncoated surfaces are left free of foreign matter, as shown in FIG. 4, without further processing.

OTHER EMBODIMENTS

Other embodiments are within the following claims. For example, an adhesive which does not decompose during processing may be employed, with the strip being removed after curing, if desired. Also, the laminations may be coated before stacking.

What is claimed is:

1. A method of forming a laminate core comprising a multiplicity of magnetic plates arrayed in face-to-face relation in a stack having opposite end surfaces, a generally circumferential outer side surface, and an axial bore sized and adapted for receiving a rotor, at least one of said outer side and bore defining surfaces also defining a multiplicity of notches sized and configured for receiving windings, said method comprising:
assembling said plates in said stacked relationship;
applying at least one strip of adhesive material generally axially along the outer surface of the assembled stack in an area not defining a said notch;
allowing said adhesive to dry in a manner to hold said plates assembled during handling at least during application of bonding material prior to a curing step;
thereafter applying, in powdered form, a bonding material in the form of a layer of dry particles of a thermoset synthetic resin to the surfaces of the assembly of plates defining said notches, said particles forming a layer covering the side surfaces of the discrete plates, and extending across spaces between adjacent plates in said stack, particles of said resin entering the spaces between said plates; and
heating said stack to a temperature at least sufficient to cure said synthetic resin to form an integral bonding layer upon the surfaces of the stack defining said notches, and extending into the gaps between the plates of said stack;
the cured thermoset resin forming said plates into a substantially rigid unit not subject to movement between layers during handling or at elevated temperatures of use; and,
after said resin is cured sufficiently to hold said plates assembled, removing at least a portion of said adhesive.

2. The method of claim 1 comprising the further step, prior to heating said stack to cure said resin, of wiping said dry particles of resin from selected surfaces of said stack to limit formation of said integral layer to desired surfaces of said laminated core.

3. The method of claim 1 wherein said plates are formed by punching, and said method further comprises assembling said plates with punching burrs oriented in the same direction.

4. The method of claim 1 wherein said plates in said stack prior to application of said adhesive material are formed from uncoated stamping stock.

* * * * *

UNITED STATES PATENT AND TRADEMARK OFFICE
CERTIFICATE OF CORRECTION

PATENT NO. : 4,614,022

DATED : September 30, 1986

INVENTOR(S) : Kenneth Bibby and Frank R. Ring, Jr.

It is certified that error appears in the above-identified patent and that said Letters Patent is hereby corrected as shown below:

Column 2, line 63, "cyanoacylate" should read --cyanoacrylate--.

Signed and Sealed this

Thirteenth Day of January, 1987

*Attest:*

DONALD J. QUIGG

*Attesting Officer*   *Commissioner of Patents and Trademarks*